US010447861B1

(12) United States Patent
Liu

(10) Patent No.: US 10,447,861 B1
(45) Date of Patent: Oct. 15, 2019

(54) INTELLIGENT CALL HANDLING AND ROUTING BASED ON NUMBERING PLAN AREA CODE

(71) Applicant: 8x8, Inc., San Jose, CA (US)

(72) Inventor: Zhishen Liu, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 0 days.

(21) Appl. No.: 16/013,449

(22) Filed: Jun. 20, 2018

Related U.S. Application Data

(60) Provisional application No. 62/524,181, filed on Jun. 23, 2017.

(51) Int. Cl.
| | | |
|---|---|---|
| H04M 7/00 | (2006.01) | |
| H04M 3/54 | (2006.01) | |
| H04L 29/06 | (2006.01) | |
| H04M 3/42 | (2006.01) | |
| H04M 3/436 | (2006.01) | |

(52) U.S. Cl.
CPC ........ H04M 3/546 (2013.01); H04L 65/1056 (2013.01); H04M 3/42059 (2013.01); H04M 3/42153 (2013.01); H04M 3/436 (2013.01); H04Q 2213/1322 (2013.01)

(58) Field of Classification Search
CPC ... H04L 65/1056; H04M 3/436; H04M 3/546; H04M 3/42059; H04M 3/42153; H04Q 2213/1322
USPC ........................ 379/219, 220.01, 221.08, 229
See application file for complete search history.

(56) References Cited

U.S. PATENT DOCUMENTS

| | | | | |
|---|---|---|---|---|
| 5,321,743 A | * | 6/1994 | Bogart | H04Q 3/0029 379/220.01 |
| 6,327,360 B1 | * | 12/2001 | Hokari | H04M 3/42229 379/207.08 |
| 7,145,899 B1 | * | 12/2006 | Pearce | H04M 3/465 370/352 |

(Continued)

FOREIGN PATENT DOCUMENTS

WO 0135579 5/2001

OTHER PUBLICATIONS

"Cisco Hosted Unified Communications Services", Cisco Product Data Sheet, Jun. 18, 2007 (retreived May 31, 2016) http://www.cisco.com/c/en/us/products/collateral/unified-communications/product_data_sheet0900aecd80670040.html.

*Primary Examiner* — Khai N. Nguyen
(74) *Attorney, Agent, or Firm* — Crawford Maunu PLLC

(57) ABSTRACT

Certain aspects of the disclosure are directed to routing decisions implemented in response to data communications. According to a specific example, one or more computer processor circuits are configured and arranged to interface with remotely-situated client entities using a first programming language, and to provide a database of data communications services based on a subscription. In response to receipt of a data communication, client-specific sets of control data can be identified. The client-specific sets of control data are derived from programming instructions received over a message exchange protocol and corresponding to a second programming language that is compatible with the first programming language. Based on the client-specific sets of control data and using a numbering plan area (NPA) code of the received data communication, a nearest extension of the client entity can be identified, and the received data communication can be routed to the nearest extension.

18 Claims, 5 Drawing Sheets

(56) References Cited

U.S. PATENT DOCUMENTS

| | | |
|---|---|---|
| 7,403,604 B2 | 7/2008 | Mundra et al. |
| 8,064,909 B2 | 11/2011 | Spinelli et al. |
| 8,656,417 B2 | 2/2014 | May |
| 8,918,867 B1 | 12/2014 | Salour |
| 8,948,358 B1 | 2/2015 | Rengarajan et al. |
| 8,964,726 B2 | 2/2015 | Lawson et al. |
| 9,137,127 B2 | 9/2015 | Nowack et al. |
| 9,160,696 B2 | 10/2015 | Wilsher et al. |
| 9,240,966 B2 | 1/2016 | Wilsher et al. |
| 9,270,833 B2 | 2/2016 | Ballai et al. |
| 9,294,433 B1 | 3/2016 | Salour |
| 9,294,515 B2 | 3/2016 | Sayko |
| 9,306,982 B2 | 4/2016 | Lawson et al. |
| 9,338,064 B2 | 5/2016 | Stratton et al. |
| 9,344,573 B2 | 5/2016 | Wolthuis et al. |
| 9,407,597 B2 | 8/2016 | Lawson et al. |
| 9,426,116 B1 | 8/2016 | Salour |
| 9,455,949 B2 | 9/2016 | Lawson et al. |
| 9,456,008 B2 | 9/2016 | Lawson et al. |
| 9,459,925 B2 | 10/2016 | Lawson et al. |
| 9,459,926 B2 | 10/2016 | Shakirzyanov et al. |
| 9,648,085 B2 * | 5/2017 | Noldus .................. H04L 69/04 |
| 10,165,114 B1 * | 12/2018 | Liu .................. H04M 3/42323 |
| 10,298,751 B1 * | 5/2019 | Liu .................. H04L 65/1059 |
| 10,298,770 B1 * | 5/2019 | Liu .................. H04L 65/102 |
| 2005/0143063 A1 * | 6/2005 | Mizutani .......... H04M 3/42263 455/426.1 |
| 2007/0047571 A1 | 3/2007 | Kandikonda et al. |
| 2007/0091800 A1 | 4/2007 | Corcoran |
| 2007/0115942 A1 | 5/2007 | Money et al. |
| 2008/0125077 A1 | 5/2008 | Velazquez et al. |
| 2009/0201916 A1 | 8/2009 | Caron et al. |
| 2010/0128709 A1 | 5/2010 | Liu et al. |
| 2010/0142516 A1 | 6/2010 | Lawson et al. |
| 2011/0170681 A1 | 7/2011 | Kole et al. |
| 2011/0320550 A1 | 12/2011 | Lawson et al. |
| 2012/0208495 A1 | 8/2012 | Lawson et al. |
| 2012/0304245 A1 | 11/2012 | Lawson et al. |
| 2013/0072153 A1 | 3/2013 | Lawson et al. |
| 2013/0212603 A1 | 8/2013 | Cooke et al. |
| 2013/0304929 A1 | 11/2013 | Fahlgren et al. |
| 2014/0044123 A1 | 2/2014 | Lawson et al. |
| 2014/0105372 A1 | 4/2014 | Nowack et al. |
| 2014/0270109 A1 | 9/2014 | Riahi et al. |
| 2015/0046899 A1 * | 2/2015 | Ganapathy ............. G06Q 10/06 717/104 |
| 2016/0156675 A1 * | 6/2016 | Ritchley .......... H04M 3/42314 379/221.06 |

* cited by examiner

INTELLIGENT CALL HANDLING AND ROUTING BASED ON NUMBERING PLAN AREA CODE

OVERVIEW

Aspects of various embodiments are directed to intelligent communications handling and routing based on numbering plan area code. Data communications platforms have allowed individuals to transmit communications using broadband Internet connections in place of traditional telephone lines. A communications endpoint device can use a broadband Internet connection to connect to a communications server that is managed by a communications service provider. The communications server can handle communications routing and provide other communications services for the communications endpoint device.

Computing servers are increasingly being used to provide various data communications services over a network including, but not limited to, routing of Voice over Internet Protocol (VoIP) calls and/or data service providers for providing communications services such as messaging, video conferencing, management of data communications exchange servers, packet switching, traffic management, website hosting, remote data storage, remote computing services, and management of virtual computing environments, among other examples. For ease of reference, the various applications, systems and services that may be provided by such computing servers may be collectively referred to as data communications services.

The use of data communications services has been widespread and significant in terms of both numbers of users and types of services being made available. This growth may be attributable to any of a wide variety of socio-economic changes such as the mobility of users of these services, the types and reduced costs of portable telecommunication tools, and the ever-evolving technology adapting to the personal and business needs of the communications users.

For business entities, the increased use of data communications services has been particularly complex, largely due to providing the same level of personal features to users from the vantage point of each business entity's communications platform. As examples, a communications service provider can be providing such data communications services to a multitude of business entities each of which uses the provided services for a customized platform configured to provide communications services to a wide range of employees. For each such customized platform, it can be particularly burdensome for the data communications service provider to adjust and reconfigure the customized platform (of each respective business entity to which such services are being provided) each time a business changes in terms of the employee's communications equipment/endpoint devices.

SUMMARY

Various example embodiments are directed to issues such as those addressed above and/or others which may become apparent from the following disclosure concerning systems and methods for using data communications control for customizable and readily configurable incoming communications routing and/or related communications services.

Embodiments are directed toward methods for use in data communications systems employing a data communications server operated by a data communications provider. In such systems, the data communications server includes one or more computer processor circuits (configured with access to databases stored in memory circuits) and configured to act as a communications-control engine for routing, processing communications and/or providing related communications services on behalf of client entities. Such client entities may be exemplified respectively as the above-noted businesses with employees ranging in number from just a few to thousands, and being located/mobile for communications services in any of a multitude of venues. In these embodiments, such methods use the communications-control engine to provide such communications services by receiving a communication corresponding to virtual office features provided by a data communications provider to end-users of a remotely-situated client entity based on a subscription, and identifying, in response to receipt of the communication, client-specific sets of control data derived from programming instructions received over the message exchange protocol and corresponding to a second programming language that is compatible with a first programming language utilized by the data communications provider. Such methods further include identifying a numbering plan area (NPA) code of the received data communication, using at least the client-specific sets of control data and the identified NPA code, determining a nearest extension of the client entity for routing the received data communications communication, and routing the received data communications communication to the determined extension of the client entity.

Certain embodiments are directed toward an apparatus for communications over one or more wide-band networks, the apparatus comprising one or more computer processor circuits and a communications control engine including at least part of the data communications server. The one or more computer processor circuits are configured and arranged to interface with remotely-situated client entities using a first programming language associated with a message exchange protocol between a data communications server and data sources, provide a database of virtual office features to the client entities based on a subscription, and generate event data corresponding to the virtual office features provided to the client entities. The communications control engine is configured and arranged to, for each respective client entity, identify, in response to receipt of a communication directed toward an end-user of the client entity, client-specific sets of control data derived from programming instructions received over the message exchange protocol and corresponding to a second programming language that is compatible with the first programming language. Moreover, the communications control engine is configured and arranged to, based on the client-specific sets of control data, identify a nearest extension of the client entity based on a NPA code of the received data communication, and route the received data communication to the nearest extension.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
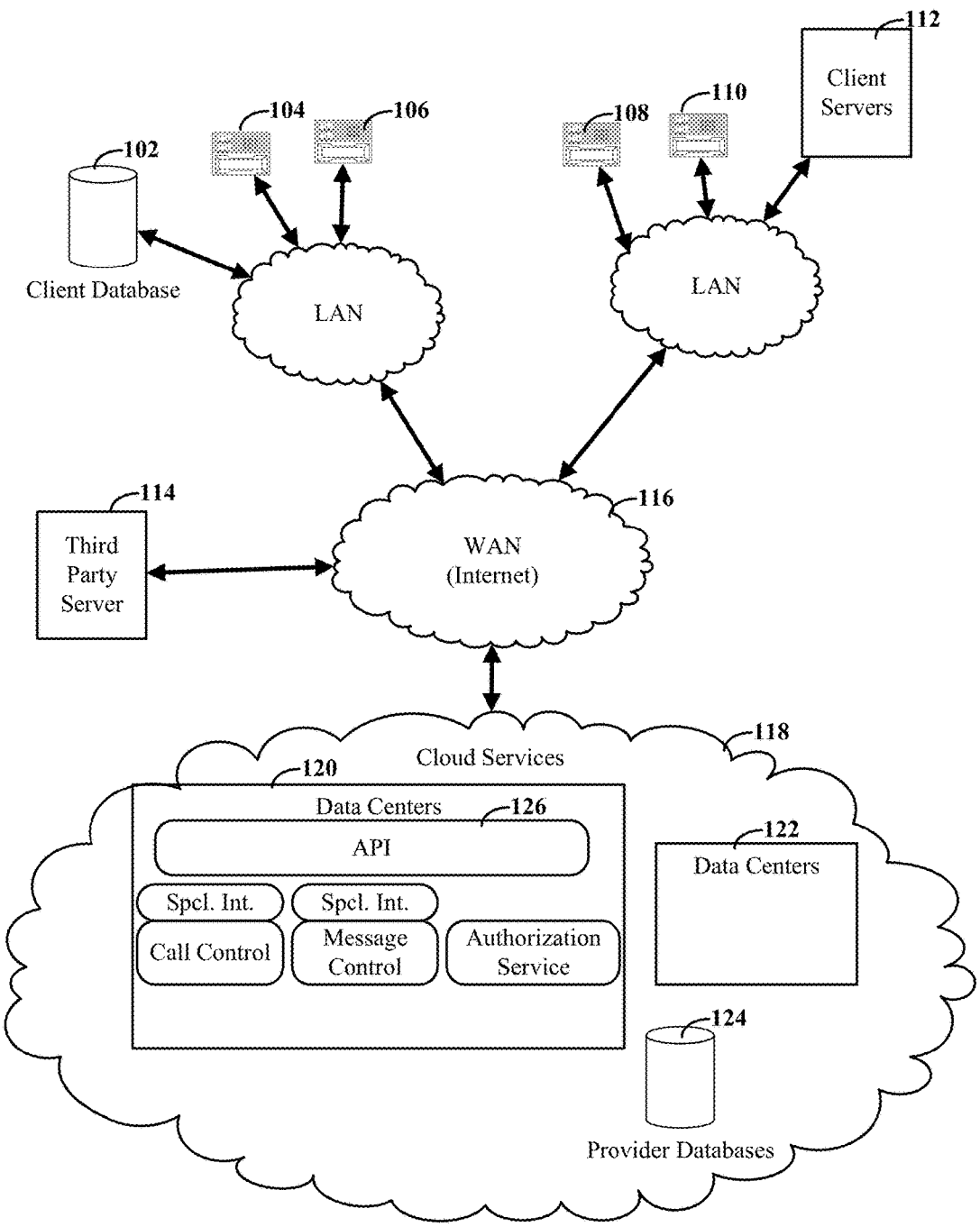
FIG. 1 is a diagram for a communications-enabled system that uses a high-level programming language for communications control functionality and operations, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving routing incoming communications relative to a receptionist. In certain implementations, aspects of the present disclosure have been shown to be beneficial when used in the context of providing communications services. While the present disclosure is not necessarily limited to such data communications systems as described herein, for purposes of facilitating understanding and appreciation of certain embodiments, the following discussion uses Voice over Internet Protocol (VoIP)-based services and systems in the context and on behalf of communications platforms of client entities which subscribe to such services from a data communications service provider (with a server).

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communication servers configured to provide data communications services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

Some communications service providers customize their services for different customers. This approach might include customizable auto attendants, communications routing, communications forwarding, and voicemail, among other available features. For particularly large clients with many different telephone accounts and numbers, implementing and updating these types of customizations can require a significant undertaking. Certain embodiments of the present disclosure are directed to an interface that allows a client-specific control engine to access and dynamically adjust the manner in which services are provided for the users of a client account, while maintaining the integrity and security of the underlying system providing the services. More particularly, embodiments of the present disclosure are directed to an interface that allows a client-specific control engine to route incoming communications based on a caller number numbering plan area (NPA) code.

According to certain embodiments, a VoIP communication system may be configured to allow a client-specific control engine to dynamically modify and control the communications flow and processing at different levels within the system, including (re)routing of incoming communications generally and by way of private branch exchanges (PBXs) and Internet Protocol PBXs (or IP PBXs) to provide intelligent routing relative to receptionists and direct dial numbers for individuals using the IP PBXs. Rules of various complexity can be used for routing incoming communications, whether to one or more receptionists, directly to extensions, to voicemail, or for other communications routing purposes. The logic used for the routing decisions can be based upon directives and related data shared across multiple PBXs, data that can be dynamically changed, and upon rules and logic that can be defined according to multiple tiers of communications routing decisions. For example, a large company may have many different offices or store locations. Portions of the communications routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating, particularly in situations where there are many thousands of extension rules can be a difficult proposition.

Certain embodiments are directed toward an apparatus for communications over one or more wide-band networks, the apparatus comprising one or more computer processor circuits and a communications control engine including at least part of the data communications server. The communications control engine is configured and arranged to identify, in response to receipt of a data communications directed toward an end-user of a client entity, client-specific sets of control data derived from programming instructions received from the client entity. As described herein, the programming instructions are received over the message exchange protocol and correspond to a second programming language that is compatible with a first programming language used by the data communications service provider. Moreover, the communications control engine is configured and arranged to, based on the client-specific sets of control data, identify a nearest extension of the client entity based on a NPA code of the received data communications, and route the received data communications to the nearest extension. For example, the client entity may wish to route received data communications (such as VoIP telephone calls) to a nearest extension, branch, or store Direct Inward Dialing (DID) of the client entity. As such, the client-specific sets of control data may instruct the data communications service provider to parse a caller number associated with the received data communication, retrieve the NPA code associated with the received data communication, and generate a query to a data store to find the nearest geographic extension to route the incoming data communication to. The client-specific sets of control data may further include a default extension to route the data communication to, in the event that communications to the nearest extension fail.

According to certain embodiments, the data communications system provides inbound and outbound communications routing for one or more PBXs. A PBX is a telephone system that switches communications between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide Direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines into the PBX for each possible connection.

According to certain example embodiments, a data communications system is configured as a Platform as a Service (PaaS) that provides a user with access to, among other things, communications routing control, PBX functions, computer telephony integration (CTI), and data analytics (in this context the user can refer to, e.g., person, group, server or CPU, or subscribing business entity). Embodiments of the present disclosure are directed toward an interface that allows users of the PaaS solution to access data communications capabilities of the underlying system, including its hardware and software components, while maintaining the integrity and security of the underlying system. Particular embodiments are directed toward a PaaS solution that allows for data communications flow to be controlled, while also providing the ability to interface with data sources that are either part of the underlying system or external to the PaaS solution. These features can be used in combination with a communications routing that can be configured and adjusted in a scalable manner.

The ability to access the underlying data communications services, including communications routing and communications control engines, can provide a platform that is both flexible and simple to implement from the viewpoints of both the data communications provider and the customers of the data communications provider. The PaaS solution can be configured to modify and control the communications flow and processing at all levels within the system, including (re)routing of incoming communications to different PBXs. When compared to an add-on type service where communications are first handled by a separate PBX, the PaaS solution may offer a number of advantages and additional features including, but not limited to, increased communications routing capabilities, scalability, and reduced complexity. For instance, access to PBX functions allows for simple communications redirection to extensions or DID numbers provided by the PBX. Moreover, the PaaS solution coordinates and routes communications between multiple PBXs using an initial communications routing switch. Communications initially routed to a particular PBX can still be rerouted to a different PBX using the initial communications routing switch.

The data communications servers providing the underlying function for the PaaS can be configured to utilize a programmable (or configurable) communication protocol such as a high-level, domain-specific programming language as might be implemented with respective data communications servers providing data communications routing and IP PBX functions on respective sides of an interface configured to facilitate the communications via the defined protocol. A particular example of a data communications server may use session initiation protocol (SIP) to handle various communications functions (e.g., call setup and tear down). However, the various embodiments discussed herein are not necessarily limited thereto. Consistent with the above and in other embodiments disclosed herein, the data communications servers can be configured to establish a leg of the communications from the data communications endpoint devices to another data communications endpoint device or to endpoints on the PSTN through use of a PSTN gateway. Each of the endpoint devices includes data communications-enabled circuitry, and may include for example, IP phones, smart phones, tablets, desktop computers, plain old telephone service (POTS) telephones, and cellular-capable devices among other example devices with circuitry configured and arranged to facilitate sending and receipt of data communications.

According to more specific example embodiments, a high-level domain-specific programmable communication protocol uses one or more languages which are defined using a markup language as the basis for the language structure. Particular implementations relate to the use of at least two domain-specific languages, one that can be used for initial communications routing and the other for providing more complex and specific communications processing functions. More particular example embodiments use an eXtensible Markup Language (XML). An XML model defines the constraints on the high-level language, including defining the set of valid commands that can be carried out by the data communications servers. Within these constraints, a customer can write XML code that self-describes the building blocks used in the customer's particular application. XML also allows for various different data structures to be embedded into the XML document or file. For example, a script written in JavaScript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s). As used herein, such domain-specific programming language(s) are referred to as XML derivative languages or XML-type languages.

Various examples of such XML derivative languages are exemplified in the Appendix as attached to the underlying U.S. Provisional Patent document (Application No. 62/524, 181 filed Jun. 23, 2017) incorporated herein by reference. In certain example data communications applications, two XML-type languages are implemented as a communications processing XML (CPXML) and a communications routing XML (CRXML), respectively as XML derivative languages corresponding to XML but customized for processing data communications on the side of the interface operating on behalf of customer entities and on the other side of the interface for higher level processing (including, for example, communications routing) by the data communications service provider. Such XML derivative languages can be written specific to types of functionality as needed for various customer entities, thereby allowing developers to program communications processing logic or service execution logic with both XML building blocks and JavaScript/TCL, or other scripting languages best suited to levels (e.g., in terms of quantity range of a customer's endpoint devices and/or in terms of complexity of the data communications-based media functionality and evolving demands expected by a customer). In certain implementations, XML derivative languages allow PaaS customer developers to program and integrate data communications flow (e.g., as provided by a cloud-based data communications service) with customer or third party application servers and databases. In particular, the communications flow can include a connection that is used as part of communications routing decisions and communications processing options that are related to one or more receptionists that can answer communications to a group of endpoint devices. The system allows different levels of communications control logic to be implemented in a manner that can facilitate scalability of the system of large organizations with many endpoint devices and with complex organizational structures that have corresponding complex communications routing requirements.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related communications data can be provided in documents corresponding to other languages and/or communications protocols; for example, one such programming language can be used for initial communications routing and another programming language can be used for providing more complex and specific communications processing functions.

According to particular embodiments, an XML engine can respond to a communication, or other event, by sending requests to a web server and get client-specific sets of control data for processing, thereby operating in a stateless manner that is similar to how an Internet browser, or similar interface uses Hypertext Markup Language (HTML). The XML engine can interpret a received client-specific sets of control data to identify XML building blocks that are then rendered (i.e., executed). Each building block can define logic relating to one or more functions, such as for voice, communications control, and flow control logic. The XML engine may also execute other types of code, such as JavaScript, to create dynamic content (e.g., dynamically generated XML-derivative) for client-side flow control. The client-specific sets of control data may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the data communications provider's cloud database). This information can then be used to drive communications flow or communications control functionality and decisions.

As applicable to routing decisions relating to receptionists, an incoming communication can be processed according to an XML, document with instructions for determining whether communications route to a receptionist, directly to a called endpoint device, or are routed and processed in some other manner. As an example, the XML document could include a set of global rules for determining how to handle communications to endpoints of a customer (e.g., a large business with many individuals and corresponding endpoint devices). XML documents can specify local rules for routing communications (e.g., to endpoint devices, voicemail, auto call attendants), or otherwise processing the communications. The local rules might be used if global rules specify that the communications are not routed to a receptionist, or if the receptionist rejects or forwards the communications on. Each of the local and global rules can be driven, at least in part, by data retrieved from a data source, such as a client server or database. As an example, the global rules could access a customer database that includes lists of caller IDs that are handled differently. The data communications server does not need to have direct access to the lists of caller IDs (which might be confidential lists and thereby represent a security risk if shared directly with the data communications server). Rather, the data communications server can send a query that includes a specific caller ID number of an incoming communication. In response to the query, information can be provided that indicates how to process the communication (e.g., whether to route the incoming communication to a receptionist or directly to the dialed endpoint device).

According to various embodiments, the high-level programming language allows a programmer access to the PaaS solution by way of a controlled and limited set of communications control functionality in the form of communications processing and routing operations. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control of, or access to, the inner workings of the data communications servers.

In various embodiments, the high-level programming language and the data communications servers that execute the high-level programming language can be configured to interface with other sources of data and control. This can include, for example, flow control decisions that are based upon code running on the client side or on the server side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

In an example embodiment, a communication system includes one or more data communications servers configured to provide data communications for endpoint devices of a plurality of client accounts. A respective client can have an account that is associated with one or more endpoint devices. Endpoint devices may be associated with a particular client account by registering the endpoint device with a particular client account serviced by the data communication server(s). Registered devices for each client account may be specified in a respective account settings file accessible by the data communication server(s).

In some embodiments, the data communication server(s) may provide data communications services using various processes and circuits. As one example, the data communication server(s) may provide data communications services that are responsive to XML documents for each respective client. The XML documents can, for example, be provided with a request to establish communications with an individual (e.g., through a telephone call or a text message).

According to various embodiments, the high-level, domain-specific programming language(s) is defined using a markup language as the basis for the language structure. More particular embodiments use an XML model that defines the constraints on the high-level language, including defining the set of valid commands that can be carried out by the data communications servers. Unless otherwise stated, the use of XML in connection with various embodiments does not necessarily limit the corresponding embodiments, such as limiting the embodiments to the use of only an XML-based language(s).

Within the system's constraints, a customer can write XML code that self-describes the building blocks used in the customer's particular application. A particular aspect of the communications processing XML is that an API can be used to embed XML into communication requests. For example, a representational state transfer- (RESTful) based application program interface (API) may allow clients to initiate communications by generating links (e.g., specifying a URI) and generating hypertext transfer protocol (HTTP) commands for the links (e.g., GET, POST, or PUT). The XML can be embedded in the link so that the XML is provided as part of the HTTP request generated when accessing the link (e.g., in response to selection from within a web browser). The XML is then used by the communications control engine when making the requested communications. In particular instances, the XML can be used to communicate information, such as time-of-day routing rules, that is then used as part of routing decision on whether to route communications to a receptionist. Additionally or alternatively, the XML can be used to direct the routing of data communications based on an NPA code of the caller/sender of the data communication.

Turning now to the figures, FIG. 1 is a diagram for a data communications-capable system that uses a high-level programming language for communications control functionality and operations, consistent with embodiments of the present disclosure. In connection with these specifically-illustrated examples, data communications endpoint devices 104, 106, 108, and 110 are configured to place and receive data communications between other data communications endpoint devices, and also between non-data communications endpoint devices. Examples of non-data communications endpoint devices include plain old telephone service (POTS) telephones and cellular-capable devices, which might also be data communications capable (e.g., smart phones with appropriate data communications software applications). The various endpoint devices include circuitry that is specially configured to provide communications functions that include interfacing with the appropriate circuitry of the communications service provider used by the corresponding endpoint device. In many contexts, a data communications-endpoint device is a data communications-capable telephone, commonly referred to as an IP phone. The data communications-endpoint devices can include, but are not limited to, desktop computers, mobile (smart) phones, laptop computers, and tablets. When each of the endpoint devices originates or receives a communication in a telephone network, each can be characterized or referred to as an addressable communications endpoint.

The communications routing and other services for the data communications can be provided by one or more data communications servers within the cloud-based system 118 (e.g., configured to provide a PaaS to customers of the data communications provider). In particular example embodiments, the data communications servers can be located within one or more data centers 120, 122, which are part of a cloud-based system 118. The data centers can be, for example, part of a cloud-based system 118 where the hardware providing the cloud services is located in a number of different data centers with different physical locations. Consistent with embodiments, the cloud services can include services provided by SIP servers, media servers, authorization servers, communications control servers, and servers providing other services to both data communications endpoint devices and the users of the data communications endpoint devices. In some instances, the various servers, including both the data communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data communications server uses session initiation protocol (SIP) to handle various communications functions (e.g., call setup and tear down); however, the various embodiments discussed herein are not necessarily limited thereto. Consistent with the above and other embodiments disclosed herein, the data communications servers can be configured to establish a portion of the communications from the data communications endpoint devices to another data communications endpoint device, or to a gateway.

Certain embodiments are directed toward an API server 126 that is configured to allow clients to create webpages or other software that can initiate communications with endpoint devices in response to requests received over the Internet 116. In particular embodiments, the API server 126 operates as a RESTful API that allows clients to generate URI links specifying parameters for a desired communication, such as content for use with generating outgoing communications from selections made through a web interface. Client entities can upload their business data into the API. For instance, a client server 112 can be configured to use the API to generate a URI link that can be displayed to an end user. The URI link can contain information that identifies an endpoint device and how the endpoint device is to be contacted (e.g., by telephone call or text message). The API generated URI link sends a communication request to the appropriate service within the data center. For example, the URI link can result in a communication with a communications control server in order to initiate a telephone communications to an endpoint device or a text message to an endpoint device.

According to various embodiments, one or more data analytics servers can monitor and analyze communications data relating to the data communications servers and data communications endpoint devices. For example, a data analytics server may track communications statistics about various different communications-related parameters, such as: communications duration, communications date, communications time of day, called parties, endpoint devices, selected data centers, selected carriers, dropped communications, transferred communications, voicemail access, conferencing features, and others. The XML can request access to the communications summary metrics and the data analytics, which can be stored in a provider database 124. For example, a script running the data communications server could parse XML derivative (control data) documents to generate database queries that direct the data communications server to query, or subscribe to, communications length summaries for all communications made to endpoints that are registered with the data communications server. The script could then use the information to control how communications are routed as well as how different (customer or provider) services are invoked. According to various embodiments, the database queries could be sent to a client or customer database 102.

Consistent with certain embodiments, the data communications server can be configured to interface with client servers 112 or even with third party servers 114. For instance, programming instructions, stored by the cloud-based system 118 in the form of client-specific control data, can identify, based upon a received data communications, a URI that points to client servers 112 or to a third party server 114. Data provided from these servers, e.g., in the form of client-specific control data can be used to specify communications routing, or other functions. In the context of communications routing to receptionists, the client-specific control data can include a URI that points to a secure server that provides information for making a routing decision. The communications control server can then make a communications routing decision based upon the information. This can add a layer of security because the data communications server does not directly access the client information.

According to embodiments, the client-specific control data can be dynamically constructed using data that is confidential to the client and therefore not shared with the service provider. As an example, the client server may have access to personal information about the individuals calling into the system (e.g., based upon their caller ID). This personal information might be part of user profiles that identify endpoint devices associated with the users, user buying history, or a geographic location of the user. The client server can use the information to customize the client-specific control data for each user. For example, a particular user might be identified as having a prior relationship with the contacted party, client-specific control data could be generated that includes instructions to route the communications directly to the contacted party. The client-specific control data could include additional rules, such as the generation of additional notifications (text message, instant message, and email) to the contacted party if the communications is not immediately answered. The ability to customize the client-specific control data based upon data accessible by the client server allows for the communications control functionality and related decisions to be decoupled from the data used to make the decisions. In particular, the service provider can carry out the communications control decisions specified in the client-specific control data without knowledge of the data used to make the decisions.

According to embodiments of the present disclosure, the client server creates programming instructions from which client-specific control data are derived, that specify queries to databases managed by the service provider. In particular implementations, the databases can contain information that is proprietary to the service provider and therefore not directly shared with the client. For example, a client-specific control data can use a conditional statement that is premised upon the results of a database query to a database maintained by the service provider. The service provider can implement the query within their system and without the client having access to the data or even the result. The result of the query can be used to determine the appropriate action, as specified in relation to the conditional statement. A conditional statement within the client-specific control data can use the result of a query to a database or other data source as the conditional operator. An example functionality for conditional statement is: if a current communication is from a user ID associated with telemarketing (SPAM communications), then the communications should be routed to a receptionist, or else the default condition is to directly route the communications to the contacted endpoint device. Using a query in the conditional statement, the service provider can keep the list of SPAM IDs as proprietary data, while still allowing a customer to indirectly use the information. Additional examples of conditional statements include the use of a query to identify a nearest extension of a client entity for routing incoming communications, based on an NPA code of an incoming communication. For instance, in the event of receipt of a data communications from a user located in Canada (as determined based on NPA code), the conditional statements may generate a query to identify a Canadian branch of the client entity, and to route the incoming data communications to the identified branch.

The provided examples are not limiting with respect to the possible uses of client-specific control data in the context of communications routing to receptionist. Additional features and configurations are contemplated and supported by the high-level programming interface and the communications control engines.

Figure 2:
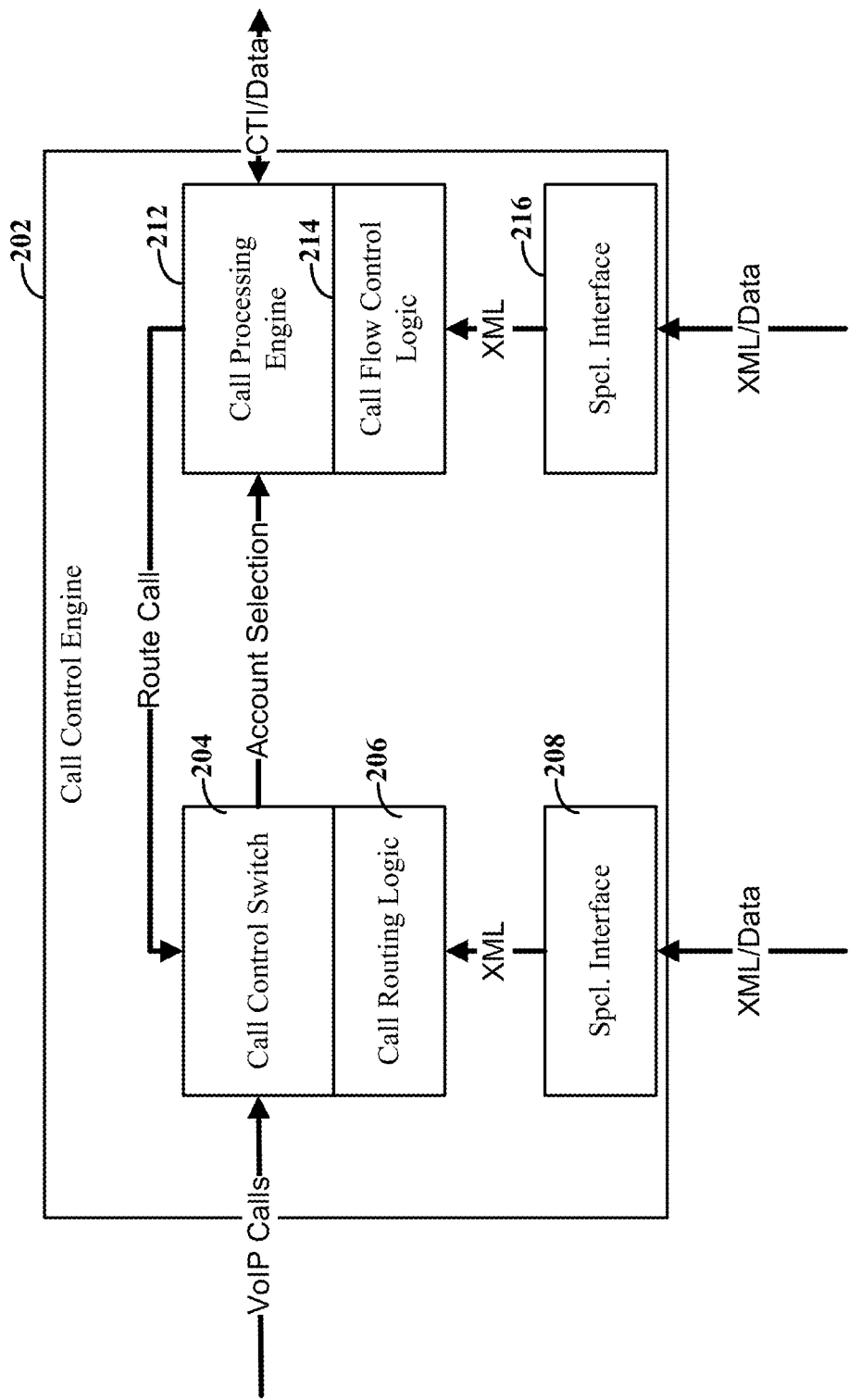
FIG. 2 is a block diagram of a communications control engine with high-level programmable language logic for two different languages, consistent with embodiments of the present disclosure.

FIG. 2 is a block diagram of a communications control engine with high-level programmable language logic for two different languages, consistent with embodiments of the present disclosure. When an incoming communication is received by the communications control engine 202, the communication can first be handled by a communications control switch 204. The communications control switch 204 can be configured to receive and process a first document that defines how the communication is subsequently routed. As discussed herein, this document can be written in a first programming language, such as a first XML derivative language, which provides limited access to the communications routing control logic of the communications control switch 204. First XML derivative documents can be provided by a data communications provider through a special interface 208, which provides XML derivative documents to a communications routing logic 206. The communications routing control logic 206 can parse and execute the first XML derivative documents while providing controlled access to the functions of the communications control switch 204.

According to various embodiments of the present disclosure, the first XML derivative language defines a limited set of commands to the communications routing logic that define how a communications is initially routed. Maintaining the first XML derivative language as a limited set of simple building block commands can help with the efficiency of the communications control switch. For example, the communications control switch 204 can be located at the perimeter of the data communications provider's routing network, which implies that it may be configured to handle a large volume of data communications. The efficiency in processing the large volume of communications can have a significant impact on the performance of the system.

Consistent with various embodiments, the first XML derivative documents specify a first level of communications routing and simple communications processing that are carried out by the communications control switch 204. For example, a communications control switch 204 may provide communications routing options for multiple branch offices and for multiple iPBXes that support the branch locations. Each branch office and associated iPBX may have multiple customer (user) accounts associated therewith. First XML derivative documents can be used to determine the routing for a communications by identifying a particular branch location, a particular iPBX and particular data communications customer account and iPBX to use in subsequent communications processing and routing. The initial routing decision is indicated by the arrow labelled as "account selection," which shows the passage of control to a communications processing engine 212.

The communications processing engine 212 can be configured to identify and execute additional documents that can be selected based upon the identified account, or upon similar identifying information, as provided by the communications control switch 204. As discussed herein, these documents can be written in a second programming language, such as a second XML derivative language, which provides access to the communications flow control logic of the communications processing engine 212. In certain embodiments, the second programming language, or second XML derivative, can include commands that support contextual communications routing and advanced communications services. The second XML derivative documents, also referred to as programming instructions, can be provided by a customer using a special interface 216, which provides received second XML derivative documents to a communications flow control logic 214. The programming instructions provided by the customer may be stored by the data communications provider in the form of client-specific control data, for subsequent retrieval and implementation. In particular implementations, the interface 216 is configured to allow a customer to upload new programming instructions to a database maintained by the data communications provider. The interface 216 can also be configured to allow client-specific control data to be retrieved from a customer-managed location. For instance, the customer can provide a base set of programming instructions that includes a URI to a customer server. The customer server can then provide the programming instructions on an as needed basis for each communications. The programming instructions could be loaded directly from a customer database, or they might be dynamically generated based upon data that is specific to the particular communications (e.g., the called party, the called party status, or the calling party identity), or to data from other inputs (e.g., a communications queue status, a status of network outages, or the like).

The communications flow control logic 214 can parse and execute the client-specific control data while providing controlled access to the functions of the communications processing engine 212. According to embodiments of the present disclosure, a second client-specific control data can be associated with a particular extension account (or group of extension accounts) and can be invoked when there is an incoming communications routed to the extension account. The communications processing engine 212 can determine whether or not a client-specific option has been enabled for the extension account, indicating that client-specific sets of control data should be executed. If enabled, then the communications flow control logic 214 can be called. Consistent with various embodiments of the present disclosure, the communications flow control logic 214 and the communications routing logic 206 are each implemented as plugin applications that interface with the communications control engine according to the respective client-specific control data.

In certain embodiments, the communications processing engine 212 can have the capability to provide feedback to the communications control switch 204. For example, a client-specific control data for a particular account may specify a condition that, if satisfied, routes a communications to a different branch office. An incoming communication, when received, may be parsed according to the client-specific control data, and the NPA code associated with the incoming communications can be determined. In response to the determination of the NPA code associated with the incoming communications, the client-specific control data may indicate that a query to a data store be generated, and a branch or store DID associated with the NPA code is identified. Once the branch or store DID associated with the NPA code is identified, the client-specific control data can direct that the incoming communications (or other data communications communication) be routed to the identified branch or store DID. Moreover, the communications processing engine 212 is configurable, using one or more sets of client-specific control data, to provide an indication of a new communications route decision as feedback to the communications control switch 204. The communications control switch 204 can respond by overriding the prior communications routing decision and rerouting the communications. The corresponding routing decision may then go to a different communications processing engine 212, which can handle the communications according to a different client-specific control data or the previously-used client-specific control data using different data to drive the communications processing and routing decisions.

Consistent with various embodiments, outbound communications, or communications originating from data communications devices supported by the communications control engine 202 and the corresponding PaaS implementation, can be routed using client-specific control data and the communications processing engine 212, as described with regard to incoming communications.

According to particular embodiments, communications routing logic 206 is first used to determine whether or not to route incoming communications to a receptionist. Communications flow control logic 214 is then used to route communications to endpoint devices other than those of the receptionist. Communications control logic can route communications whether the receptionist is bypassed by communications routing logic 206 or the communications has been forwarded by the receptionist after first receiving the communications.

As a particular example, a business can offer virtual office spaces to many different entities. The virtual office services can include conference spaces and temporary work space. The virtual office services can include a receptionist that handles communications for the different entities. The business may have many different building locations for the conference spaces and temporary work space (e.g., distributed throughout the country or world). There can be a variety of different options for routing communications to receptionists. For example, each building location could have a dedicated receptionist. The communications routing logic 206 would therefore be configured to route communications based upon associations between the contacted number, the entity or account associated with the contacted number, a particular building location, and the receptionist assigned to the building. As another example, a single receptionist could provide services for multiple building locations. The communications routing logic 206 would include appropriate associations for this option. Another possibility is the use of a pool of available receptionists that are each assigned to provide answering services for the same set of entities. The communications routing logic 206 can include rules for selecting a receptionist from the pool (e.g., based upon the current availability of each of the receptionists). Combinations of these options (and potentially other options) are also possible.

According to certain embodiments, the communications routing logic 206 can include rules that a specific to each building location. For example, building locations may have different hours during which they are open and therefore supported by a receptionist (e.g., based upon differences in time zones). The communications routing logic 206 can be configured to route communications to a receptionist when the building corresponding to the contacted number is open for business. When the building is closed, the communications routing logic 206 does not route the communications to the receptionist. Control logic 214 can then route the communications to the appropriate endpoint device. Control logic 214 might also route the communications to voicemail, or otherwise handle the communications according to the settings for the particular account associated with the dialed number.

According to various embodiments, the communications routing logic 206 can be configured to make communication routing decisions based upon a specific schedule for each building or receptionist. For example, the schedule can include a period of time for lunch as well as indicating holidays during which no receptionist is available. In some instances, the communications routing logic 206 can retrieve real time (or near real time) data about the availability of a particular receptionist. For example, the communications routing logic 206 can query a server that provides status for the receptionist. The server can be linked to an application that the receptionist uses to change their status. The receptionist may, for example, change their status to "away from desk" or "busy" when they leave their desk for any reason. The communications routing logic 206 receives the query results and can adjust the communications routing accordingly. In the example where the status is "away from desk" the communications routing logic 206 might place the individual on hold after playing an appropriate greeting and notification message. The communications routing logic 206 might also forward communications directly for handling by the control logic 214. In such a manner, a nearest extension of the client entity for routing the received data communication includes identifying a particular geographic location of the client entity among a plurality of geographic locations of the client entity, based on the NPA code of the received data communication, and wherein routing the received data communication includes routing the received data communication to the particular geographic location based on the client-specific sets of control data associated with the particular geographic location. Other routing options, of varying complexity, are also possible.

In certain embodiments, the communications routing logic 206 can include exceptions that are based upon the contacted number. For example, one or more entities may desire to always bypass the receptionist. Other entities might want to bypass the receptionists only if certain criteria are met. One manner in which the exceptions can be configured is by having the communications routing logic query a database or server to identify contacted numbers that are subject to one or more exceptions. If the query indicates an exception exists for the contacted number, the communications can be sent for handling by the control logic 214. The control logic 214 might include further logic for determining whether or not to use a receptionist. For example, the control logic 214 could be linked to calendar or other status indicator for the contacted entity. If the control logic 214 determines that the contacted party is unlikely to answer, the control logic 214 can pass control of the communications routing back to the communications routing logic 206. The communications routing logic 206 can determine that the communication has been rerouted back from the control logic 214 and route the communication to the receptionist in response.

The use of multiple layers of routing logic 206, 214 can be useful for reducing the overhead in supporting a large amount of telephone numbers and endpoint devices. For instance, modifications to the communications routing logic can be made in a central set of client-specific control data and then be immediately applied for all accounts and endpoints. Further, new endpoints can be dynamically added and removed without having to modify the higher-level client-specific control data. For instance, the endpoints, accounts, and telephone numbers can be stored in a database that is referenced by the first XML, derivative documents when making routing decisions. The database can be managed independently from the communications routing logic and the communications control logic.

Certain embodiments are directed toward similar functionality within a single, flat logical (XML derivative) layer. For instance, the reception routing logic and routing for each account or endpoint device can be within the same client-specific control data or set of programming instructions. For example, each set of client-specific control data can include communications routing rules for a respective business extension with business hour schedule such as Mon-Friday 8:00 am-5:30 pm. The rules might specify that all the communications from external numbers are routed to the receptionist during these hours. Once a communication is answered, the receptionist may transfer the communication a particular endpoint device by selecting an extension number. To differentiate between communications that have already been routed through the receptionist, a communications routing rule can be created that identifies communications originated from the receptionist. Communications identified in this manner can be routed directly to the indicated extension (e.g., to avoid being continuously redirected back to the receptionist).

According to various embodiments, the receptionist may have a switchboard display that shows information about incoming communications and allows for the communications to be answered by selecting an option on the switchboard display. In certain embodiments, the switchboard display is viewable within an Internet web browser application. The communications control engine(s) can provide data for display via the switchboard as well as receive information for handling and routing communications.

Figure 3:
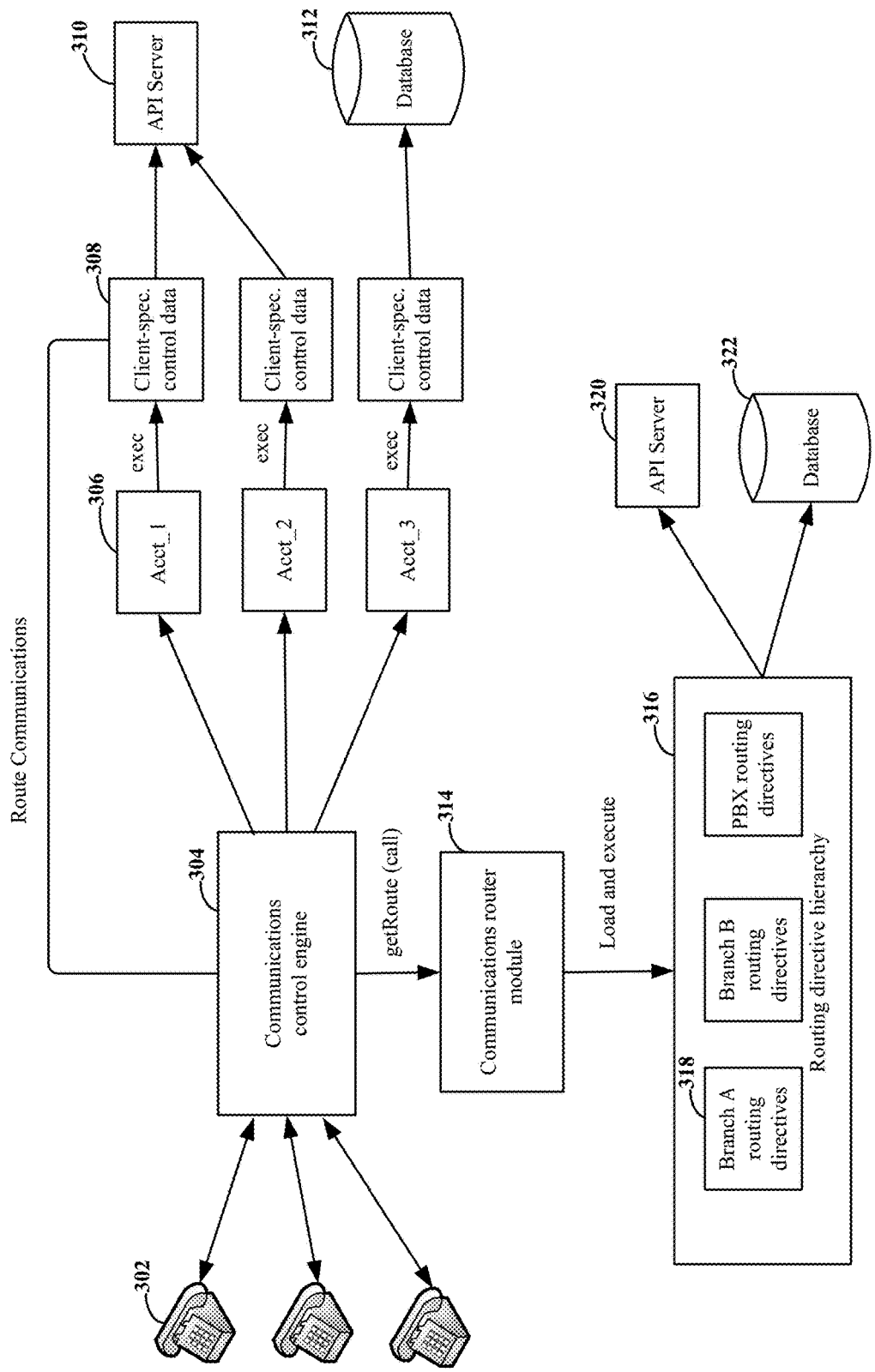
FIG. 3 is a block diagram showing the use of a hierarchy of programmable language documents, consistent with embodiments of the present disclosure.

FIG. 3 is a block diagram showing the use of a hierarchy of programmable language documents, consistent with embodiments of the present disclosure. Communications control engine 304 can provide communications flow control and routing in a manner that can be consistent with discussions found herein and relating to communications control engines, data communications servers, and the other figures. Consistent with various embodiments, the communications control engine 304 is an IP PBX that is part of a data communications PaaS. The IP PBX can be hosted by a data communications service provider and located at one or more data centers. Various IP PBX features can be provided for clients and endpoint devices 302, such as communications forwarding, remote pickup, communications routing, and voice mail. For instance, the IP PBX can be configured using Java-based applications that manage voice over IP networks.

Consistent with various embodiments, data communications can be managed by programming instructions written in two different high-level languages: a first high-level programming language and a second high-level programming language. Together, the programming instructions specify communications interception rules for how the customer would prefer communications intercept to be handled for both inbound and outbound communications. For instance, programming instructions provided by a client and stored by the data communications provider in the form of client-specific control data 308 can be associated with an extension account 306, or with groups of extension accounts. The extension accounts 306 can represent a specific individual and their associated extension number(s). Client-specific control data 308 that is configured in this manner will be invoked by the communications control engine 304 after an incoming communication is routed to an extension that has client-specific control data capabilities enabled. Client-specific control data can also be used for communications flow processing of outbound communications. In addition to telephone communications, other forms of messages (e.g. text messages and email messages) can be automatically generated in response to outgoing communications using commands included in the client-specific control data. Restrictions can be placed on outbound communications based upon factors such as time of day or communications history. Another client-specific control data function could be implementation of auto/communications attendants that are each specific to the client-specific control data routing decision.

The communications control engine 304 may also consult with communications router module 314. The communications routers can be programmed using programming instructions 318, and with JavaScript for dynamic data access and logic handling. The programming instructions 318 can be arranged in a router XML hierarchy 316, which can specify different client-specific control data 318 depending upon the branch or IP PBX that is identified as corresponding to the communications. Once the communications router documents are loaded, they can be cached in memory and used by the communications control engine 304 to make a routing decision. When a communication is routed through the communications control engine 304, the communications control engine can consult with programming instructions. The branch level can be identified, for example, based on the branch ID of caller (for outbound calls) or callee (for inbound calls). Delineations other than the branch are also possible, such as by the called country, the particular store, the state, or other factors. Such determinations may be made based on the NPA code of the caller, or other location determination. If a route result is not determined, the communications control engine 304 can also consult with PBX-level programming instructions to obtain routing decisions. Examples of a route result from a script are "Accept," "Reject," or "NewRoute." Using the programming instructions, the programmable communications router module 314 provides the communications control engine 304 with the ability to handle communications intercept/filter reject or re-route the communications to a different target destination.

A particular example of uses for client-specific control data is to provide initial routing decisions relative to a receptionist. Client-specific control data can specify whether incoming communications are first routed to a receptionist. A few examples of how the client-specific rules and logic can be configured are discussed in more detail herein. If the communications control engine 304 determines that the communication is not to be first sent to a receptionist (or the communication is being forward from the receptionist), the communications control engine 304 can pass communications routing control over to the logic defined by the appropriate client-specific control data 308.

The communications router module 314 can also be configured by client-specific control data to handle sophisticated communications flow scenarios where the communications routing is changed after the initial determination. For example, the client-specific control data can include commands (e.g., "Reroute") that the communications control engine 304 uses to provide feedback to the programmable communications router module 314, which use the set of client-specific sets of control data for initial routing decisions. This might allow, as an example, a first set of client-specific control data to be overridden by the second set of client-specific control data.

According to particular embodiments, the programmable communications routers (using a high-level programming language) module 314 can be viewed as plugins to the communications control engine 304. The communications router plugins may have two levels, Branch and PBX levels. The communications router supports—high-level programming structures that specify how the PaaS can be utilized by a customer. For example, the high-level programming language can define sets of conditional statements, data access requests, and communications routing commands: if/else, condition, goto, log, var, script, query, data, accept, reject, route statements, or other commands. In particular embodiments, the first high-level programming language can be considered a subset of the second high-level programming language by containing a part, but not all, of the second high-level programming language communications flow commands. This distinction can be useful for keeping the programming instructions provided by the data communications provider light weight so that communications routing decisions are simplified and efficient. More complex tasks, such as the use of media and advanced communications handling, can be handled using a second high-level programming language and the larger set of commands used by the data communications client entity. Using such programmable communications routes, a few example uses include: school district that generates short message service (SMS) or email notifications to parents whenever an emergency number is dialed; off hour restriction of outbound communications with the second high-level programming language; communications center lockdown to provide outbound dialing restriction for phones; computer initiated dialing with caller identification (ID) override based destination database table, and communications return to target DID/agents; and implementation of a communications black list (denying communications to/from the list) or white list (allowing communications to/from the list) with potentially large lists and dynamic updating capabilities.

Consistent with embodiments of the present disclosure, both the high-level programming language and the second high-level programming language provide the capability of handling dynamic data from multiple sources. Examples of these sources can include PBX internal state such as communications session object with caller, callee, routes, and last redirect address information, remote services (e.g., application program interface servers) and databases 312, 322. The dynamic data can therefore be provided from a variety of sources including, but not necessarily limited to, communications route session data (caller id, callee id, or route from/to), query custom object (to a database) in the data communications provider system/cloud, and access data through HTTP RESTful API (e.g., from API servers 310, 320). For instance, the client-specific control data (derived from the programming instructions provided by the client entity in the second high-level programming language) can include a web resource that is identified by URIs. The web resource might be a customer HTTP server that responds to a conditional query (e.g., whether or not a communications queue is above a threshold) with XML derivative code that instructs the communications control engine on how to route, or otherwise handle, the communications.

Figure 4:
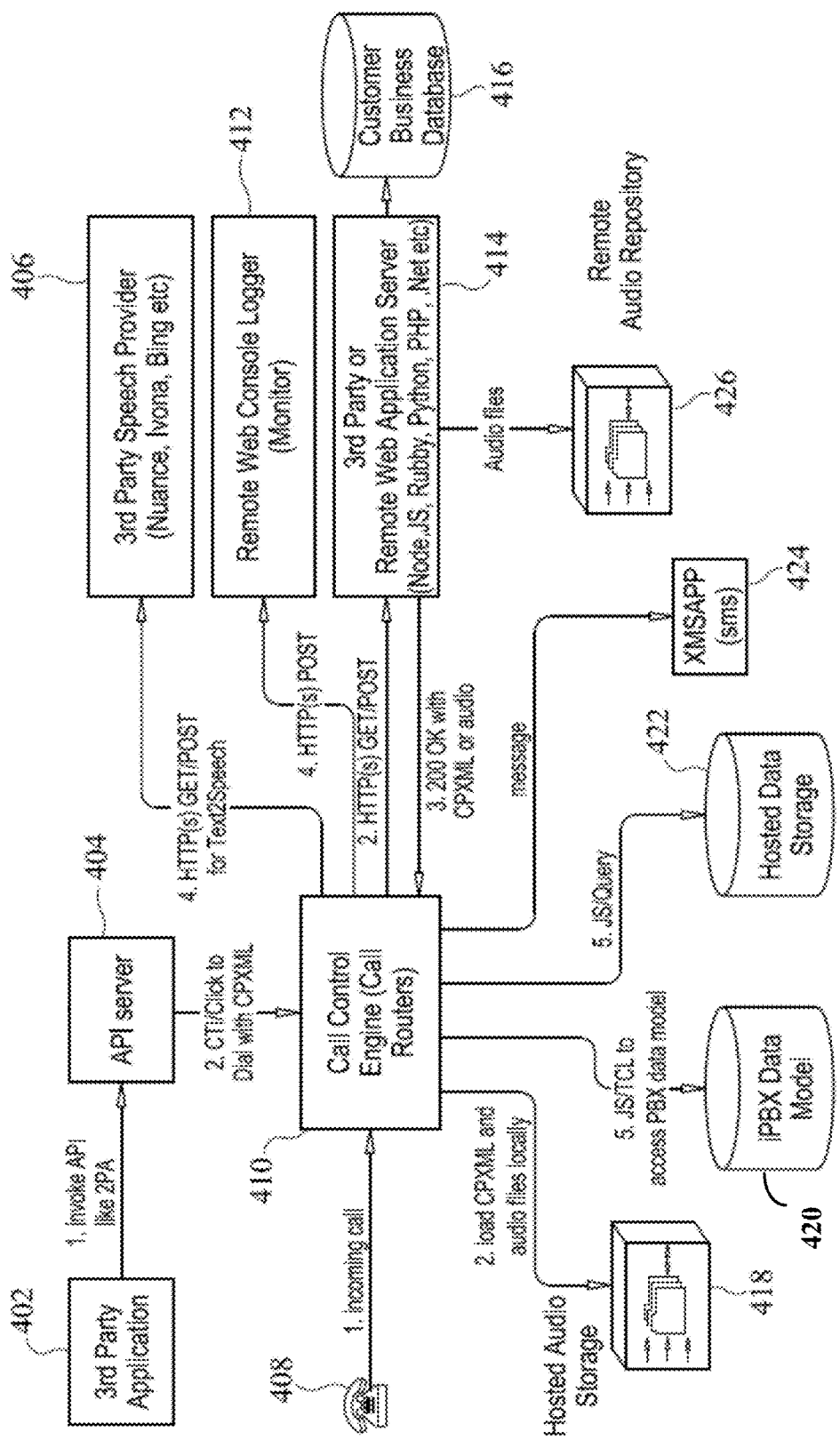
FIG. 4 is a block diagram showing interconnections to a communications routing switch, consistent with embodiments of the present disclosure.

FIG. 4 is a block diagram showing interconnections to a communications routing switch, consistent with embodiments of the present disclosure. As another particular non-limiting example, an incoming communication is received from a telephone device 408 by the communications control engine 410. The communications control engine 410 can use the communications destination information carried by the communications to invoke a proper data communications services action (e.g., CTI or a click to dial functionality), which in some instances can be provided by a third party application server 402 using a data communications provider's API server 404. The client-specific control data can be embedded within the click-to-dial request or CTI service data.

As a particular example, a third party application can use an API provided by API server 404 to contact an authorization server for the purpose of obtaining authorization to use certain servers or functions of the system. The authorization procedure can include for example (without imposing limitations) the use of access tokens generated consistent with the authorization protocol. The API server 404 can also provide API functions that allow the third party application to embed client-specific control data into communications control requests. For example, programming instructions (from which the client-specific control data are derived) could be embedded in an HTTP request using a text-to-binary format, such as the Base64 format. The programming instructions can include commands that rely upon the use of a variety of different functions offered by the system. This might include a text-to-speech application 406 or the playing of audio files 418 or 426. The programming instructions might also include queries for information stored in databases 422 or 416.

In another non-limiting example, the API provided by API server 404 may make communications routing decisions based on defined communications options for particular applications. For instance, the API might include an option to perform an action such as play a recorded message to a particular destination using the communications control engine 410. In another example, the API might include an option to block a caller identification function on email notifications. In such instances, when a communication is received and forwarded to voicemail, the API may set the caller identification to 'anonymous' and the email notification and file name would thereafter include 'anonymous' in the place of a caller name. The API might also include an option to perform an action, such as play a welcome message under defined circumstances. Yet further, the API might include an option to request the recipient of a communications to enter a particular dual-tone multi-frequency (DTMF) signal (such as the number '1') to answer an incoming communication.

The API server 404 can also provide API-defined functions that interact with the client-specific sets of control data in a defined manner. For instance, an API provided by API server 404 might direct the communications control engine to call a destination, and then connect to an extension account with a pre-defined set of client-specific control data. In such examples, the communications control engine might pass communications options and application data (e.g., customer data) to the XML engine (e.g., communications control engine 410). For example, an appointment reminder option may be defined in the API and performed by the communications control engine 410, where appointment information in a calendar extension account may be routed to a particular destination with instructions to play in voice or SMS/XMS format. Details regarding the appointment may be retrieved from the extension account using the client-specific control data, such as a location, date, time, and notes regarding the appointment.

In some examples, client-specific control data may invoke an API provided by the API server 404. For instance, client-specific control data may be used to create a message recording service, obtain an access token from an authentication server, send a HTTP request to the communications control engine to route a communication to a particular destination and play the recorded message. In such an example, a user may dial into an extension account with the client-specific control data, record the message to be sent, then end the communication. The client-specific control data may identify the end of the communication and execute logic which will initiate the HTTP request to invoke an API to play the recorded message to a particular destination number.

Such client-specific control data (provided by the client in the form of programming instructions written in a high-level programming language) can also be loaded from a data storage 422, which might be hosted by the data communications provider as part of the PaaS solution. Client-specific control data can also be retrieved from a customer database 416. For example, the client-specific control data could be retrieved using an HTTP connection to a web application server 414. At the same time that the client-specific control data are retrieved, additional information can also be provided, such as audio files 418, 426. The audio files could be used for various purposes, such as for implementing auto attendant functions.

In various embodiments, a customer can use databases and other data sources that are offered by the data communications provider without having direct access to the data. For instance, the customer can use the programming instructions (written in the high-level programming language) to generate queries that identify a data source and a conditional response based upon the query results. The communications control engine can carry out the conditional response based upon the results of the query without the customer ever receiving, or otherwise having access to, the data driving the conditional response. A particular example involves a query to a communications analytics database for the data communications provider. A customer could be given the limited, indirect access to the database through XML-driven queries, while the data communications services provider maintains control over the proprietary contents of the database. The database might also contain information about individual callers that would raise privacy concerns in which cases the data communications services provider can use another set of rules for deciding whether and how to use/share such privacy information. As an example, one set of privacy rules may ensue from law of one or more particular governing agencies, requiring that such information be first encrypted before being transferred or stored to a readable/accessible platform. In this manner, the client-specific sets of control data are retrieved with such additional information for decisions to be made based on another set of rules.

In some instances, the customer can allow the data communications provider to indirectly access data sources in response to queries. For example, the customer can specify, in client-specific control data, a URI that points to a customer-provided server and specifies an associated query. The customer-provided server can execute, for example, a local script that may rely upon customer data. The script can generate a response in the form of client-specific control data. The communications control engine can then carry out communications routing, or other communications control functions, based upon the response and without ever having direct access to the customer data.

In certain embodiments, the communications control engine 410 can provide communications processing information to a monitor server 412 (e.g., a remote web console logger application). The communications control engine 410 can then execute the client-specific control data. In an example implementation, the client-specific control data might invoke various other services, such as a text-to-speech application 406. For example, client-specific control data might specify that a string of text be converted to speech using a corresponding command (e.g., "<say>Hello, please hold. </say>"). The client-specific control data can also request access to various other data sources, such as IP PBX data model 420 and a hosted data storage 422. Further, the client-specific control data can specify that an SMS/MMS (XMS) text message be sent using XMSApp 424 or generate new communications (e.g., for call conferencing or call forking). The provided examples of capabilities using client-specific control data are not limiting.

Figure 5:
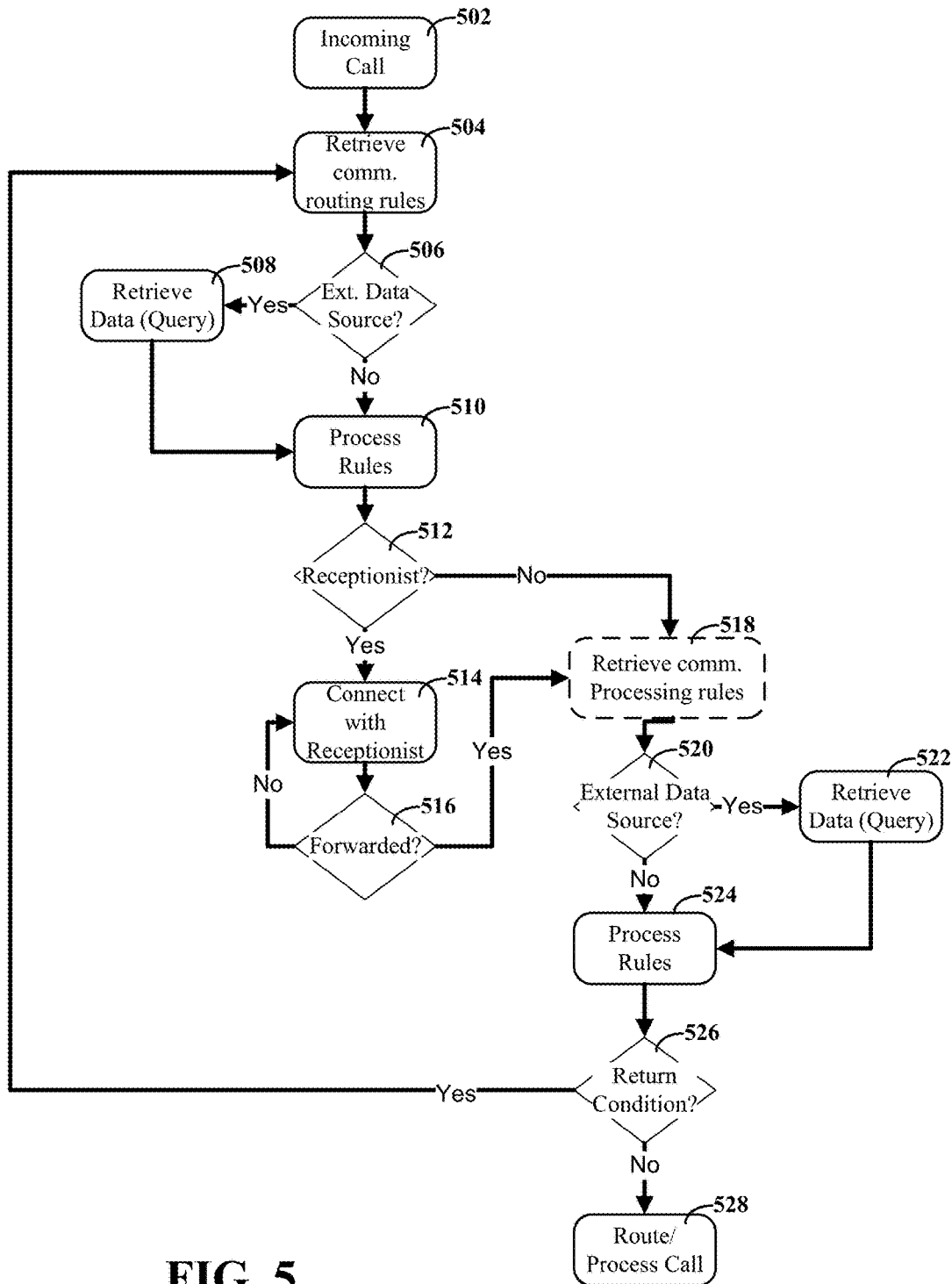
FIG. 5 is a flow diagram for controlling communications routing to a receptionist, consistent with embodiments of the present disclosure.

FIG. 5 is a flow diagram for controlling communications routing to a receptionist, consistent with embodiments of the present disclosure. The flow begins with incoming communications, per block 502. The incoming communications information provides data about the number contacted and may also include information about the calling number (e.g., Caller ID). The contacted number may correspond to one of multiple accounts that are supported by a receptionist (or by several receptionists), for example, operating on behalf of a client entity subscribing to a set of data communications services. In response to receipt of the communications, a communications control engine (e.g., 410 of FIG. 4 at the services provider side of the interface) can access the appropriate communications routing and communications processing rules per block 504. As discussed herein, the rules can be provided from the subscribing client entity in the form of programming instructions written in a high-level programming language, and client-specific control data corresponding to the programming instructions can be stored for receipt and interpretation by the communications control engine.

In particular embodiments, there can also be multiple levels of communications processing rules and optionally with multiple client-specific sets of control data or different sets of instruction sets used in connection with the different respective levels. As a specific example, the communications control engine can use a first (e.g., light-weight) set of programming instructions that functions as a plugin module to the communications control engine. Subsequent communications processing rule levels can use documents written with more complex language(s) that can use a superset of commands relative to the first level (e.g., programming instructions corresponding to the second programming language).

Consistent with certain embodiments, the communications control engine can rely upon external data source(s), per block 506. As discussed herein, several different manners may be used so that data can be efficiently retrieved from the external data sources, per block 508. For example, client-specific control data can be retrieved from an external source. For example, the communications control engine might operate by sending requests to a web server and get client-specific control data for processing data communications. The communications control engine can interpret a received client-specific control data to identify (XML) language building blocks that are then rendered (executed). Each building block can define logic relating to one or more functions, such as functions for voice, communications control, and flow control logic. The requests can include relevant information about the incoming communications, such as the called number and the caller ID. The XML-type document may define query requests that the communications control engine generates in order to retrieve data from databases or other sources of data. A query could be formatted for consistency with the source of the data (e.g., JSON) to retrieve data from third party application servers or from the data communications server provider's cloud database).

The communications control engine processes the rules defined by the XML rules along with any retrieved data, per block 510. For instance, the communications control engine can process rules defined in the client-specific control data to identify a nearest extension of the called client/customer, based on an NPA code associated with the caller, or other geographic identification technique. The communications control engine can then proceed with the communications routing processes, as described herein. One result of the processing can be a determination of whether or not to route the communication to a receptionist, per block 512. Upon connection with a receptionist, per block 514, the communication can remain connected until the receptionist chooses to forward the call to the called party (or to another party), per block 516.

According to some embodiments, communications that either have not been intercepted (e.g., bypassed the receptionist) or have been forwarded by the receptionist, can be processed according to another set of client-specific control data (e.g., XML/CPXML documents), per block 518. In particular implementations, the documents retrieved per block 518 can be written using a language that has an instruction set that is a superset of the instruction set for the language used by the document retrieved per block 504 (e.g., a second XML derivative language being a superset of the first XML derivative language). The increased size of the instruction set can facilitate more complex communications processing and routing operations to be defined. For example, the first XML derivative language can be used primarily for determining initial routing decisions for all incoming communications. This routing decision can be made by a communications control engine located at a communications routing switch that can route the incoming communications to any of a plurality of IP PBXs. Each IP PBX can have a corresponding communications control engine and client-specific control data. The client-specific control data might invoke more complex communications processing operations, such as triggering computer telephony integration (CTI) modules used by the called party or playing audio that is appropriate for the particular communication (e.g., audio that is selected based upon factors indicated by the client-specific control data).

Consistent with certain embodiments, the communications control engine(s) can rely upon external data source(s), per blocks 520 and 522. As discussed in connection with blocks 506 and 508 (and in other discussions herein), there are several different manners by which data can be retrieved from the external data sources, per block 522. The communications control engine(s) processes the rules defined by the client-specific control data along with any retrieved data, per block 524. Based upon the rules, the communications can be routed and processed, per block 528.

In some embodiments, the communications can still be routed back to a receptionist, or rerouted to a different IP PBX. In particular, the client-specific control data could indicate that the communications be processed again by the first communications control engine as noted by the connection between blocks 526 and 504. The communications control engine of the IP PBX can provide information that adjusts how the communication is routed during this second pass through the first communications control engine (e.g., thereby avoiding a loop condition). For instance, a general communications interception rule for a location may bypass the receptionist for all communications at a particular time of day. A particular communication would then be sent to an IP PBX that corresponds to the account of the dialed party. The client-specific control data for the corresponding account might include conditions that route the communication back to a receptionist. For instance, the client-specific control data could check the online status of the contacted party relative to an application running on their computer. In particular, the client-specific control data might be directed to an API that provides the online status. The conditional routing could specify that if the individual is in currently in a meeting the communications should be routed back to the first communications control engine with instructions to route the communications to an alternative party or to a receptionist.

More Detailed and/or Experimental Embodiments

Consistent with the above-characterized embodiments, various other embodiments are based on implementations which involve alternative features and/or involving a type of programming language which is different than disclosed above for use as part of the above embodiments. Accordingly, the present disclosure is not necessarily limited to specific methods, systems, applications and devices in and stemming from the specific embodiments disclosed herein. Other related embodiments and aspects can be fully incorporated in each such disclosed (contemplated/suggested) embodiment. Some of these aspects and embodiments would be recognized from the following discussion.

In certain embodiments, the client-specific control engines provide client-specific control data to the data communications server(s) via an interface protocol platform that characterizes the format in which the client-specific sets of data are communicated to the data communications server. According to various embodiments, data is communicated via the interface protocol platform using high-level programming language instruction set. The high-level programming language instruction set allows a programmer access to the data communications server(s) (or PaaS computing server(s) providing remote services) by way of a controlled and limited set of communications control operations and functions. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control or access the inner workings of the data communications servers.

Consistent with the above discussion, at the client side of the data communications services, the client's computer-based processing (e.g., by the client-specific control engine) generates and submits control (routing/data-communication) directives for assessment and use by the data communications service provider. In a typical implementation, these directives can be realized using codes or one or more commands (or a script of program-created commands). As examples, such codes or command sets can be implemented using a variety of programming control approaches. These approaches include, for example, a programming language (such as C++, XML, JAVA, HTLM, SQL, etc.) common to both the client-specific control engine and to the data communications service provider, which receives the directives (submitted from the client side) for adjusting the data communications services being provided to the submitting client. In some implementations, look-up tables with codes/commands as entries can be used by the client engines each time a service change is needed. The entries can be pre-generated by the service provider for use by the client, manually entered by either the client or an installer, and/or generated by logic circuitry (such as implemented in hosted FPGA fabric). For instance, entries may be generated by logic circuitry based on a set of limited assumptions and conditions applicable to that specific type of client and its service expectations/subscription (e.g., no more than 10 extension phone lines in any designated geographic region, only 2 designated extension lines permitted to videoconference, etc.).

By using a common interface protocol (e.g., the programming language, codes or command sets) which is understood by the data communications service provider, authentication and updating for added (telephony) services is readily achieved automatically and remotely without burdening the data communications service provider with cost-intensive set up procedures. Depending on the level of services being added/changed for each client, and/or depending on the client's manual-operator and/or automated technology, the control directives can be generated and submitted in various (coded) ways such as described above and also, for example, by dial tone input generated remotely on behalf of each client, by smartphone app specific to the client, by voice recognition, or combinations thereof. The client engine can also prompt the user to effect and select decisions upon certain client-generated or provider-prompted events. Consistent with the instant disclosure, control directives can be generated by the client (and/or client engines) based on various criteria/parameters According to embodiments of the present disclosure, the data communications servers can be configured to use different high-level programming languages for different functions, where each programming language has a different set of commands. For example, a first high-level programming language can be used to create documents that control communications routing decisions for high volumes of communications traffic, as might occur at the edge of a data communications provider's system. These communications routing decisions can, for example, identify a particular branch office or an IPBX of a particular customer. The identified IPBX might then have additional documents written to communicate using a second high-level programming language that is tailored toward more specific communications processing capabilities that might be associated with a particular account or another identifiable grouping. The distinction between the two programming languages can be particularly useful in terms of improving the scalability of the system. For instance, the language used for communications routing decisions can be relatively light weight, with fewer commands and capabilities. In particular implementations, the first (communications routing) language can contain a subset of the commands available in the second (communications processing) language.

According to various embodiments, the high-level, domain-specific programming language(s) are defined using a markup language as the basis for the language structure. More particular embodiments use extensible markup language (XML). An XML model defines the constraints on the high-level language, including defining the set of valid commands that can be carried out by the data communications servers. Within these constraints, a customer can write XML code that self-describes the building blocks used in the customer's particular application. Another aspect of the communications processing XML is that it allows for various different data structures to be embedded into the XML document or file. For example, a script written in JavaScript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s).

Particular implementations relate to the use of two separate languages, one that can be used for initial communications routing and the other for providing more complex and specific communications processing functions. In various portions of the present disclosure, the two languages are referred to as either communications processing XML (CPXML) or communications routing XML (CRXML).

The data communications servers providing the underlying function for the PaaS can be configured to utilize a high-level, domain-specific programming language. A particular example language is referred to as Communications Processing eXtensible Markup Language (CPXML). CPXML refers to a communications processing language which defines the message exchange protocol between a communications control server (e.g., an IntraSwitch with a CPXML Engine) and other sources of information, such as databases, web applications, authentication servers, and servers providing various communications-related services. CPXML can allow developers to program communications processing logic or service execution logic with both XML building blocks and JavaScript/TCL, or other scripting languages. In certain implementations, CPXML allows PaaS customer developers to program and integrate data communications flow (e.g., as provided by a cloud-based data communications service) with customer or third party application servers and databases.

A CPXML engine can send requests to a web server and get XML (CPXML) responses for processing, thereby operating in a stateless manner that is similar to HTML/Internet browser. The CPXML engine can interpret a received CPXML response, and render (execute) CPXML building blocks. Each building block can define functions relating to voice, communications control, and flow control logic. The CPXML engine may also execute other types of code, such as JavaScript, to create dynamic content (e.g., dynamically generated CPXML) for client-side flow control. Each CPXML document may have URL links to a web server for iterative processing, or it may include query requests for retrieving data from various sources. A query could be formatted for consistency with the source of the data (e.g., by using JavaScript Object Notation (JSON) to retrieve data from third party application servers or from the data communications server provider's cloud database). This information can then be used to drive communications flow or communications control decisions.

CRXML defines a limited set of commands to the communications routing logic that allows a customer to define how a communications is initially routed. Maintaining the CRXML as a limited set of simple building block commands can help with the efficiency of the communications control switch. For example, the communications control switch can be located at the perimeter of the data communications provider's routing network, which implies that it may be required to handle a large volume of data communications. The efficiency in processing the large volume of communications can have a significant impact on the performance of the system.

Consistent with various embodiments, the CRXML documents specify a first level of communications routing and simple communications processing that are carried out by the communications control switch. For example, a communications control switch may provide communications routing options for multiple branch offices or locations and for multiple PBXs that support the branch locations. Each branch and PBX may have multiple customer (user) accounts associated therewith. CRXML documents can be used to determine the routing for a communications by identifying a particular branch location, a particular PBX and particular data communications customer account to use in subsequent communications processing and routing. The initial routing decision is indicated by the arrow labelled as "account selection," which shows the passage of control to a communications processing engine.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, endpoint device, gateway, system, unit, controller, and the like. In these contexts, and using as just one example, the term "block" is or includes a circuit (also sometimes "logic circuitry" or "module") that carries out one or more of these or related operations/activities (e.g., a communications control circuit). For example, in some of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processor circuit and memory circuit that are configured to provide services to other such circuit-based devices. Moreover, a communications endpoint device (or endpoint) includes a communication circuit (e.g., transceiver circuits for send and receiving audio or other data) and (computer) processor circuits which are configured to establish data communication sessions with other communications endpoint devices (e.g., personal computers, IP-enabled mobile phones, and tablet computers). In certain embodiments, such a processor circuit is one or more computer processor circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus for communications over one or more wide-band networks, the apparatus comprising:
   one or more computer processor circuits configured and arranged to:
      interface with remotely-situated client entities using a first programming language associated with a message exchange protocol between a data communications server and data sources;
      provide a database of data communications services to the client entities based on a subscription; and
      generate event data corresponding to the data communications services provided to the client entities; and
   a communications control engine including at least part of the data communications server, the communications control engine configured and arranged to, for each respective client entity:
      identify, in response to receipt of a data communication directed toward an end-user of the client entity, client-specific sets of control data derived from programming instructions received over the message exchange protocol and corresponding to a second programming language that is compatible with the first programming language;
      based on the client-specific sets of control data, identify a nearest extension of the client entity based on a numbering plan area (NPA) code of the received data communication; and
      route the received data communication to the nearest extension.

2. The apparatus of claim 1, wherein the communications control engine is configured and arranged to parse a caller number associated with the received data communication and generate a query to retrieve the NPA code associated with the received data communication.

3. The apparatus of claim 2, wherein the client-specific sets of control data specify an alternate extension to route the data communication to in the event that routing of the data communication to the nearest extension fails.

4. The apparatus of claim 1, wherein the client-specific sets of control data instruct the communications control engine to parse a caller number associated with the received data communication, retrieve the NPA code associated with the received data communication using the parsed caller number, and generate a query to a data store to find the nearest geographic extension to route the received data communication based on the retrieved NPA code.

5. The apparatus of claim 1, wherein the client-specific sets of control data specify communications interception rules that identify when to intercept an incoming communication and route the incoming communication to a receptionist.

6. The apparatus of claim 1, wherein the communications control engine is configured and arranged to, based on the client-specific sets of control data, determine if the received data communication is from a user identifier associated with a telemarketer, and route the received data communication to a receptionist responsive to a determination that the received data communication is from a user identifier associated with a telemarketer.

7. The apparatus of claim 1, wherein the communications control engine is configured and arranged to, based on the client-specific sets of control data, determine if the received data communication is from a user identifier associated with a telemarketer, and route the received data communication to the end-user responsive to a determination that the received data communication is not from a user identifier associated with a telemarketer.

8. The apparatus of claim 1, wherein the communications control engine is configured and arranged to, based on the client-specific sets of control data, identify the NPA code of the received data communication, identify a geographic location from which the received data communication originated based on the NPA code, and identify a branch location of the client entity based on the geographic location from which the received data communication originated.

9. The apparatus of claim 1, wherein the communications control engine is configured and arranged to, based on the client-specific sets of control data and in response to identification of the NPA code associated with the received data communication, generate a query to a data store and identify a store direct inward dialing (DID) number of the client entity based on the NPA code.

10. The apparatus of claim 1, wherein the communications control engine is configured and arranged to, based on the client-specific sets of control data, determine hours during which the nearest extension is open for business, and route the received data communication to a receptionist in response to a determination that the nearest extension is open for business.

11. The apparatus of claim 1, wherein the communications control engine is configured and arranged to, based on the client-specific sets of control data, determine a particular schedule associated with the nearest extension, and route the received data communication based on the particular schedule of the nearest extension.

12. A method for use in a data communications system, comprising:
receiving a data communication corresponding to data communications services provided by a data communications provider to end-users of a remotely-situated client entity based on a subscription via a message exchange protocol between a data communications server and data sources;
identifying, in response to receipt of the data communication, client-specific sets of control data derived from programming instructions received via the message exchange protocol and corresponding to a second programming language that is compatible with a first programming language utilized by the data communications provider;
identifying a numbering plan area (NPA) code of the received data communication;
using at least the client-specific sets of control data and the identified NPA code, determining a nearest extension of the client entity for routing the received data communication; and
routing the received data communication to the determined nearest extension of the client entity.

13. The method of claim 12, wherein the client-specific sets of control data specify communications interception rules that identify when to intercept an incoming data communication and route the incoming data communication to a receptionist.

14. The method of claim 13, wherein determining a nearest extension of the client entity for routing the received data communication includes identifying a particular geographic location of the client entity among a plurality of geographic locations of the client entity, based on the NPA code of the received data communication, and wherein routing the received data communication includes routing the received data communication to the particular geographic location based on the client-specific sets of control data associated with the particular geographic location.

15. The method of claim 13, including retrieving, based on the client-specific sets of control data, an audio file based upon identification information associated with the received data communication.

16. The method of claim 12, including determining, based on the client-specific sets of control data, a particular schedule associated with the nearest extension, and routing the received data communication based on the particular schedule of the nearest extension.

17. The method of claim 12, including parsing a caller number associated with the received data communication and generating a query to retrieve the NPA code associated with the received data communication.

18. The method of claim 17, including routing the data communication to an alternate extension of the client entity in response to a failed connection attempt with the nearest extension.

* * * * *